United States Patent
Bhaskaran et al.

(10) Patent No.: US 10,038,808 B1
(45) Date of Patent: Jul. 31, 2018

(54) METHODS AND SYSTEMS FOR REMOTELY CONFIGURING A MULTI-FUNCTION DEVICE

(71) Applicant: XEROX CORPORATION, Norwalk, CT (US)

(72) Inventors: Gayathri Bhaskaran, Chennai (IN); Aditya Sarvan Tatapudi, Chennai (IN); VijayaKumar Alagarsamy, Chennai (IN); Poomaran Pandian, Ramanathapuram (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/417,264

(22) Filed: Jan. 27, 2017

(51) Int. Cl.
*G06F 3/12* (2006.01)
*H04N 1/00* (2006.01)
*H04N 1/32* (2006.01)

(52) U.S. Cl.
CPC ..... *H04N 1/00973* (2013.01); *H04N 1/00244* (2013.01); *H04N 1/32117* (2013.01); *H04N 2201/0094* (2013.01); *H04N 2201/3205* (2013.01); *H04N 2201/3274* (2013.01)

(58) Field of Classification Search
None
See application file for complete search history.

(56) References Cited

U.S. PATENT DOCUMENTS

| 8,891,111 B2 | 11/2014 | Hutchings et al. |
| 8,953,190 B2 | 2/2015 | Poysa et al. |
| 9,306,980 B2 | 4/2016 | Shimizu |
| 2010/0058482 A1* | 3/2010 | Nagumo ............ H04N 1/00912 726/26 |
| 2012/0281251 A1* | 11/2012 | Salgado ................ G06F 3/1204 358/1.15 |
| 2016/0360059 A1* | 12/2016 | Homma ............. H04N 1/00962 |
| 2017/0201651 A1* | 7/2017 | Sugiyama ............ H04N 1/4433 |

* cited by examiner

*Primary Examiner* — Henok A Shiferaw

(57) ABSTRACT

The present disclosure discloses methods and systems for remotely configuring a multi-function device without requiring an expert visit at a user's place. The method includes transmitting a configuration request through the multi-function device for configuring the multi-function device along with a unique parameter of the multi-function device. Based on the request, one or more configuration files having one or more keys are retrieved, as generated by a remote server. The one or more keys are generated based on the unique parameter of the multi-function device and one or more features to be configured related to the multi-function device. As a next step, the multi-function device is automatically configured by installing the one or more configuration files using the one or more keys.

24 Claims, 6 Drawing Sheets

METHODS AND SYSTEMS FOR REMOTELY CONFIGURING A MULTI-FUNCTION DEVICE

TECHNICAL FIELD

The disclosed subject matter relates to multi-function devices. More particularly, the present disclosure relates to methods and systems for remotely configuring multi-function devices.

BACKGROUND

A multi-function device is an electronic device that performs a plurality of functions such as photocopying, scanning, facsimile, and printing and it performs any such functions as selected by a user. The multi-function device is an all-in-one device that is almost a necessity in office environments and is gaining popularity in home environments too. Some users/customers may wish to own their devices outright and take responsibility for maintaining and servicing such devices. On the other hand, some users lease multi-function devices and a manufacturer or a service provider takes the responsibility of maintaining these devices. In such a situation, the users may not even want to know the details about when the devices will be serviced. Further, the manufacturer may want to know fairly in advance when maintenance is necessary to minimize down time.

Typically, manufacturers configure their devices with default plans (for example, billing plans, service plans, billing impression mode etc.) during manufacturing process. For example, by default the speed plan for the printer may be 35 PPM. However, if the customers want to change their plans based on the increase or decrease usage of the devices, they generally contact customer care. Following which, a technical support person visits the customer site to perform the required configuration. Here, the configuration or re-configuration process is delayed until the technical support person arrives at the customer site and this affects the customer in terms of resource down time and cost. Therefore, there is a need for an efficient solution (in terms of time and cost) for configuring multi-function devices or such equivalent devices.

SUMMARY

According to an embodiment, the present disclosure discloses a method for remotely configuring a multi-function device without requiring an expert visit at a user's place. The method includes transmitting a configuration request through the multi-function device for configuring the multi-function device along with a unique parameter of the multi-function device. Based on the request, one or more configuration files having one or more keys are retrieved, as generated by a remote server. The one or more keys are generated based on the unique parameter of the multi-function device and one or more features to be configured related to the multi-function device. As a next step, the multi-function device is automatically configured by installing the one or more configuration files using the one or more keys.

According to another embodiment, the disclosure discloses a method for automatically installing one or more new features or updating one or more existing features at a multi-function device. The method includes storing settings corresponding to the one or more existing features in a memory of the multi-function device. A request from the multi-function device is transmitted along with a unique parameter of the multi-function device. Based on the unique parameter, one or more configuration files having one or more keys are retrieved, as generated by a remote server. Then, the one or more configuration files are automatically installed to install the one or more new features or to update the one or more existing features at the multi-function device. The updated settings are stored in the memory of the multi-function device. Finally, a configuration status is transmitted to the remote server.

According to one more embodiment, the disclosure discloses a multi-function device. The multi-function device includes a memory and a remote services client process. The memory is configured for: storing a Uniform Resource Locator (URL) of remote services; and storing settings corresponding to one or more existing features of the multi-function device. The remote services client process runs on the multi-function device and is configured for: transmitting a configuration request through the multi-function device along with a unique parameter of the multi-function device; based on the request, contacting the remote services using the stored URL to retrieve one or more configuration files having one or more keys; and based on the above, invoking a plug-in manager to automatically install the one or more configuration files on the multi-function device using the one or more keys, wherein the configuration request relates to at least one of: updating the one or more existing features and installation of one or more new features.

According to an additional embodiment, the disclosure discloses a system for remotely configuring a multi-function device. The system includes a remote server and a multi-function device. The remote server is configured to: generate one or more keys corresponding to a request from a user for configuring the multi-function device, wherein the request relates to at least one of: updating one or more existing features and installation of one or more new features; and store the one or more keys and one or more configuration files in the remote server. The multi-function device is in communication with the remote server and is configured to: store settings corresponding to the one or more existing features of the multi-function device; transmit a configuration request through the multi-function device along with a unique parameter of the multi-function device; based on the unique parameter, retrieve the one or more configuration files having the one or more keys as generated by the remote server; automatically install the one or more configuration files to install the one or more new features or update one or more existing features of the multi-function device; and transmit a configuration status to the remote server for validation.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
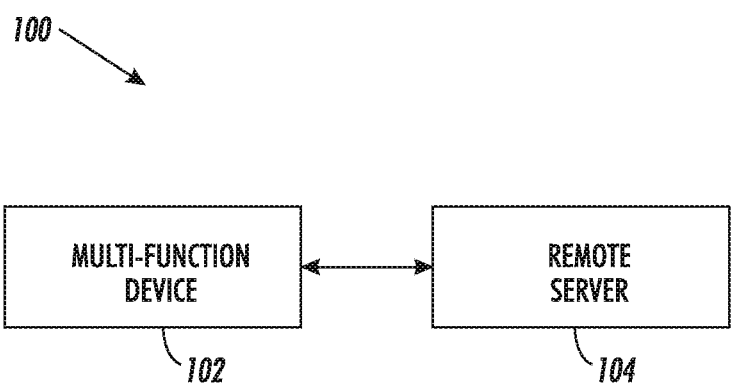
FIG. 1 illustrates an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

The term "multi-function device" refers to a device or a combination of device that offers separate functionalities such as printing, copying, scanning, faxing or a combination of these functionalities. In the context of the current disclosure, the multi-function device communicates with a remote server for configuring the multi-function device by retrieving one or more configuration files.

"A remote server" refers to any device or system located remotely from the multi-function device. In context of the present disclosure, the "remote server" facilitates remote configuration of the multi-function device and can further perform any functionalities required for/while configuring the multi-function device. The remote server may interchangeably be used with the phrase "remote unit."

The term "configuration" refers to modification of one or more existing features of the multi-function device or installation/addition of one or more new features. The modification further includes enabling, disabling, removing, updating of one or more settings/features. Further, the term configuration includes configuration and/or reconfiguration of the device.

"Feature" denotes any characteristic of the multi-function device. Few examples include a service plan, a speed plan, a billing impression mode, a print support, a language support and the like. The term feature can interchangeably be used with the term settings.

A "configuration file" denotes a single file or a combination of files having instructions to configure the multi-function device. The configuration file or the instructions may have any suitable format. One such non-limiting example is XML format.

The term "configuration request" refers to a request by a user for modifying or installation of one or more features (new features or existing features). For example, the configuration request may relate to modifying a speed plan. In another example, the configuration request may relate to adding Arabic language support.

The term "key" refers to an alpha numeric string generated by the remote server, based on the multi-function device and one or more features that the user wishes to add or modify. The term key is also referred to as feature installation key.

Overview

During manufacturing, multi-function devices are configured with default plans, and reconfiguration of such devices is a challenge and time consuming task. To reconfigure or add some new features, customers typically contact customer care. Following which, a technical engineer visits customer's site and completes the configuration of the multi-function device. For example, a device supports different speeds (35, 45, 55 PPM) based on device hardware and in order to change the speed service, the engineer has to visit and modify. This process involves additional cost to the customer and moreover, the multi-function device may face a downtime or may not have new and improved features. In order to eliminate the downtime, reduce costs, and increase performance benefits, the disclosure provides a method and a system for configuring a multi-function device from a remote location without requiring an onsite visit.

Exemplary Embodiments

FIG. 1 illustrates an exemplary environment 100 in which various embodiments of the disclosure can be practiced. The environment 100 includes a multi-function device 102 and a remote server 104 connected over a network (although not shown). Various examples of the network may include, but not limited to, a local area network (LAN), wide area network (WAN), world wide web (www), public switched telephone network (PSTN), cellular telephone network, or any other terrestrial or satellite network appropriate. As depicted, the multi-function device 102 can be a printer, a scanner, a copier, a fax machine or a combination of these. While in other example, the multi-function device 102 can be an all-in-one printer or a multi-function printer.

In the context of the present disclosure, the multi-function device 102 communicates with the remote server 104 for configuring the multi-function device 102, based on a request from a user. To this end, the multi-function device 102 identifies the need to configure the multi-function device 102. The need is identified automatically or based on user's input. For example, the need can be realized automatically at user defined intervals, for example, each use, monthly or the like. In another example, the user can provide the input through a user interface of the multi-function device. The configuration relates to addition of one or more new features or modifying one or more existing features of the multi-function device 102. The modification of features includes enabling a feature, disabling a feature or updating a feature, while addition of the features includes installation of one or more new features. Various examples of the features may include, but not limited to, a service plan, a billing plan, a speed plan, print support (for example Air Print), language support (Arabic language support), security support (McAfee Secure) and so forth. In one example, the configuration may relate to change in speed plan, while the configuration may be installation of security support feature.

The multi-function device 102 transmits a configuration request to the remote server 104 along with a unique parameter of the multi-function device 102. Based on the unique parameter, the multi-function device 102 retrieves one or more configuration files having one or more keys from the remote server 104. Once retrieved, the multi-function device 102 installs the configuration files on the multi-function device 102 in order to configure the multi-function device 102. In this manner, the multi-function device 102 is configured remotely without requiring a technical engineer to visit at a customer/user place.

Exemplary Block Diagram

Typically, a multi-function device can have different kinds of variants like low, mid and high based on hardware of the multi-function device. It can be considered that a low range multi-function device supports a range of speeds like 35, 45 PPM or the like. And if the user wishes to change the speed, the speed can be modified using the methods and systems of the present disclosure. Similarly, customers may initially want limited features on their multi-function devices when they buy the device but later the customers want to have more features, in such cases, the multi-function device can be remotely configured using the methods and systems of the present disclosure. These are just few examples, the disclosure may be implemented for any other scenario, when the multi-function device is to be configured.

Figure 2:
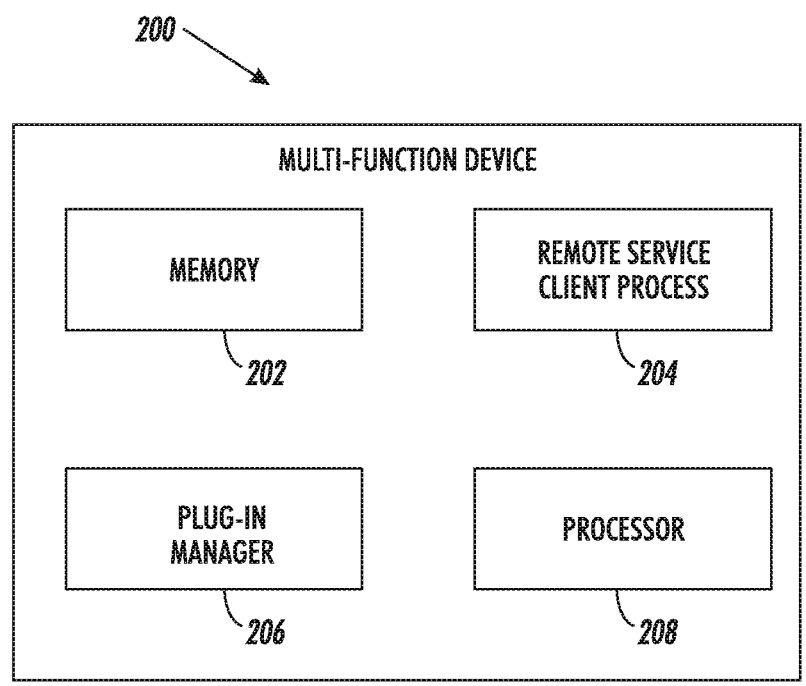
FIG. 2 illustrates a block diagram of a multi-function device, according to an embodiment of the disclosure.

FIG. 2 shows a block diagram of a multi-function device 200, according to an embodiment of the disclosure. The multi-function device 200 includes a memory 202, a remote services client process 204, a plug-in manager 206, and a processor 208. Each of the shown components 202, 204, 206 and 208 communicate with each other via network protocols known in the art or later developed technologies. For example, a bus (although not shown) may permit communication among the components of the multi-function device 200. For a person skilled in the art, it is understood that the multi-function device 200 can be configured to have various additional modules, components, or elements required for configuring the multi-function device 200. Some examples of modules include, but not restricted to, a receiver, a transmitter or any other modules required for configuring the multi-function device 200.

Figure 3:
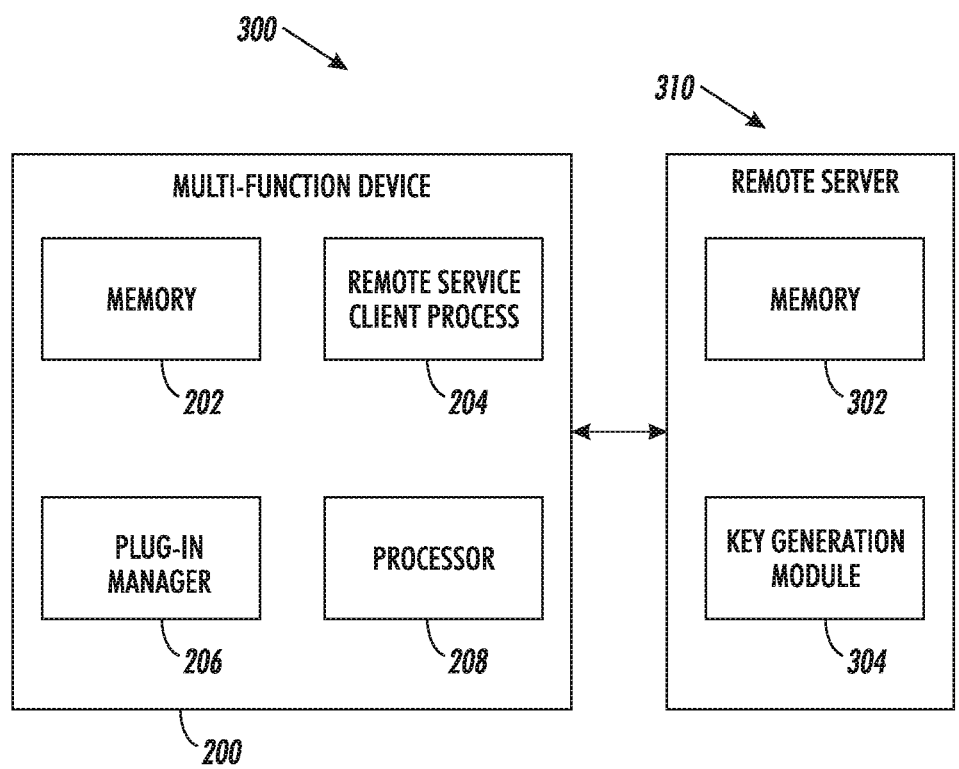
FIG. 3 illustrates an overall system for configuring a multi-function device, according to an embodiment of the disclosure.

The memory 202 is configured to store information and access links (such as Uniform Resource Locator, URL) or other information for contacting/accessing a remote unit (see FIG. 3 or FIG. 1). The memory 202 further stores information related to the multi-function device 200 such as a serial number of the multi-function device 200, settings or features of the multi-function device 200 and the like. Along with this, the memory 202 further stores one or more configuration files or any other information as received from the remote unit. The memory 202 can be a Read Only Memory (ROM), a Random Access Memory (RAM), a Solid State Drive (SSD), removable flash drives, over the air storage devices, or the like. The processor 208 may include at least one conventional processor or microprocessor that interprets and executes instructions of the multi-function device 200. The processor 208 further coordinates with other components 202, 204 and 206 for configuring the multi-function device 200 as and when required.

As shown, the remote services client process 204 is configured to realize the need to configure the multi-function device 200. In some embodiments, the remote services client process 204 may automatically identify the need of a new feature to be configured or the need to modify an existing feature of the multi-function device 200. In other embodiments, the need to configure the multi-function device 200 may be identified based on user's input. In such cases, a user interface may be presented to the user to provide his or her inputs. For example, the input may be provided via a touch-based display or a separate input unit may be provided for providing the input.

Based on the identification, the remote services client process 204 transmits a configuration request to the remote unit along with a unique parameter of the device 200. To this end, the multi-function device 200 establishes a communication with the remote unit. In particular, the remote services client process 204 contacts the remote unit using access links such as universal resource locator (URL) links. In other examples, the access links can be IP address, MAC address, Memory address, and like. Using the access links, the remote services client process 204 transmits a configuration request to the remote unit requesting for one or more configuration files for configuring the multi-function device 200. Along with the request, a unique parameter of the multi-function device 200 is transmitted. The unique parameter may include a serial number or any unique identifier of the multi-function device 200. However, it may be appreciated by a person skilled in the art that there may be other information like MAC address, MAC ID, etc. that may be used for identifying the multi-function device 200.

Still referring to FIG. 2, the remote services client process 204 retrieves the one or more configuration files for configuring the multi-function device 200. The configuration files include one or more keys as generated based on an initial request from the user (more details in FIG. 7). The configuration files are retrieved based on the unique parameter of the device 200 and may vary based on the need of configuration. For example, a configuration file for modifying a speed plan may be different from a configuration file for modifying a billing plan. In an example, the configuration file is an XML (Extensible Markup Language) file including details like serial number, features or settings to be added or modified and the keys.

In some embodiments, the configuration files may be encrypted files and thus, may be received with encryption/decryption keys. The received configuration files may be encrypted to ensure only the authenticated multi-function device such as device 200 receives the configuration files. Encryption/decryption may be performed using any of the techniques such as, but not limited to, Advanced Encryption Standard (AES), Rivest Cipher 4 (RC4), Triple Data Encryption Standard (DES) or any similar techniques as known in the art or developed later.

The remote services client process 204 upon receiving the configuration files, retrieves the keys from the configuration files and invokes the plugin/plug-in manager 206. The plugin manager 206 may be a hardware module specialized for configuration such as, for example, installation of new features, updates to the existing features, or the like. In other embodiments, the plugin manager 206 may be a software program stored in the memory 202 that can be called for configuration. Upon invoking, the plugin manager 206 installs the received configuration files to either install the one or more new features or update the one or more existing features.

In embodiments, where the configuration files are encrypted files. The decryption of files may be performed using encryption keys. The decryption may be performed using the serial number of the multi-function device 200 that may be transmitted along with the configuration files or separately. After decrypting the files, the plugin manager 206 installs or updates the feature on the multi-function device 200 using the received configuration files.

After the successful installation of the configuration files, the remote services client process 204 sends a status message to the remote unit indicating a successful installation of the feature or update of the existing feature, thereby enabling the remote unit to validate the status of the feature installed or updated. The new or updated features and corresponding settings are then stored in the memory 202 of the multi-function device 200. In this manner, the multi-function device 200 is configured remotely.

In cases a crash occurs during the installation, the remote services client process 204 restarts the process when the multi-function device 200 complete reboots.

Exemplary System

FIG. 3 shows an overall system 300, according to an embodiment of the disclosure. The system 300 includes the multi-function device 200 and a remote server/unit 310. As discussed in FIG. 2, the multi-function device 200 includes memory 202, remote services client process 204, plugin manager 206 and processor 208. The multi-function device 200 is connected to the remote server 310 via suitable network as known in the art or developed later. The details of the multi-function device 200 and functionality remain the same as discussed above in conjunction with FIG. 2.

As shown, the remote server 310 includes a memory 302, and a key generation module 304. The memory 302 is configured to store one or more keys as generated based on an initial request from a user. The memory 302 maintains a list of all the keys generated for the multi-function device 200. The memory 302 also maintains configuration status as and when received from the multi-function device 200. Further, the memory 302 stores configuration files for configuring the multi-function device 200. The configuration files may be of pre-defined format such as XML and may store one or more instructions in a pre-defined format. The configuration file may vary based on configuration type. The configuration files store unique parameter of the multi-function device 200, configuration details, i.e., features to be configured and one or more keys. The features include one or more new features to be installed on the multi-function device 200 or the one or more existing features to be updated at the multi-function device 200.

The key generation module 304 generates one or more keys based on the request initially received from the user. The request may be placed initially by placing a call to a service center or via an email and later via the multi-function device 200 as discussed above in detail. The keys indicate which feature to be added or modified and are specific to the multi-function device 200. The keys are alphanumeric in format but other formats may also be implemented. The keys are generated for each request from the user.

Exemplary Method Flowcharts

Figure 4:
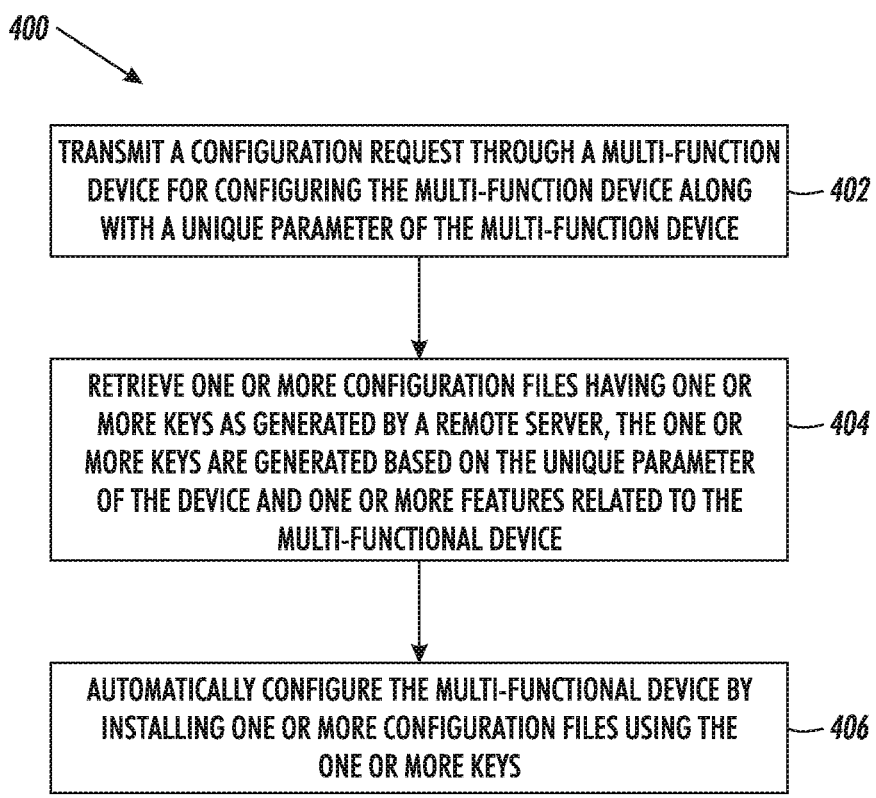
FIG. 4 illustrates a method for remote configuration of a multi-function device, according to an embodiment of the disclosure.

FIG. 4 illustrates a method flowchart 400 for remotely configuring a multi-function device or an equivalent device. The method may be implemented by the multi-function device or the equivalent device. At 402, a configuration request is transmitted through a multi-function device for configuring the multi-function device. The configuration request is transmitted along with a unique parameter of the device such as a serial number of the device. The configuration request is generated by a user by pressing a pre-defined diagnostic button on the multi-function device. For example, the diagnostic button may be a physical button on the multi-function device, or a touch based button on the multi-function device. Further, the request is transmitted from the multi-function device to a remote server. As shown in the snapshot 600 of FIG. 6, the user presses the button 602 for transmitting the configuration request.

At 404, one or more configuration files and one or more keys as generated by the remote server are retrieved. Then, the one or more keys are retrieved from the one or more configuration files as received. The one or more key are generated based on the unique parameter of the multi-function device and one or more features related to the multi-function device. As shown, the configuration files can be downloaded from the multi-function device using a button marked as 604 in FIG. 6. At 406, the configuration files are installed on the multi-function device to automatically configure the multi-function device.

In embodiments, where the one or more configuration files as received are encrypted files, in such cases, the configuration files can be decrypted before installing the configuration files on the multi-function device.

Upon installation, a configuration status is transmitted from the multi-function device to the remote server. The configuration status is transmitted as success when the configuration is performed satisfactorily. After successful installation, the one or more keys stored with the remote server are removed. Else, the one or more configuration files are retrieved again from the remote server and the process is repeated until the configuration is done successfully.

Figure 5:
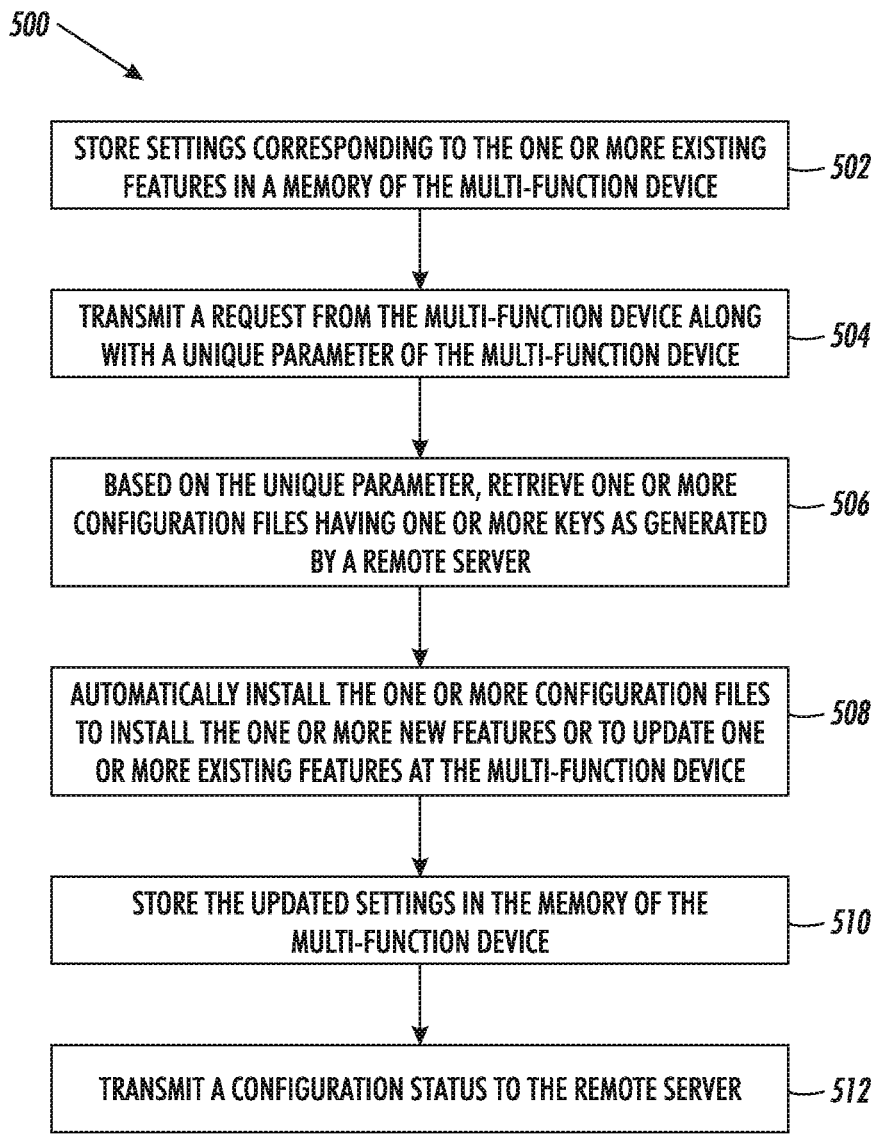
FIG. 5 is a detailed method flowchart for remotely configuring a multi-function device.

FIG. 5 shows a method flowchart 500 for remotely configuring a device, according to an embodiment of the disclosure. Specifically, FIG. 5 shows a flowchart for installing one or more new features or updating one or more existing features of the device. For example, the features may relate to a service plan, a speed plan, a billing impression mode, a print support, a language support and a security support. The device, for example, can be a multi-function device, a printer, a scanner, a fax machine or a combination of these. For simplicity, the device can be considered as the multi-function device, however, the method may be implemented for any device as mentioned above or otherwise.

At 502, settings corresponding to one or more existing features of the device are stored in a memory of the device. For example, if a feature is speed, then speed value such as 35 PPM is stored in a memory of the device. At 504, a request from the device is transmitted along with a unique parameter of the device. The request is initiated by a user through the device. For example, the user presses a pre-defined button provided on the device. Here, the device contacts the remote server using a URL stored in the device. A log is created at the multi-function device for each configuration request initiated by the user. Then at 506, one or more configuration files having one or more keys are retrieved from the remote server based on the unique parameter of the device.

At 508, the one or more configuration files are automatically installed to install the one or more new features or to update one or more existing features at the device. The configuration files are of a pre-defined format. The configuration files are installed, for example, to update the existing speed from speed 35 PPM to 45 PPM. At 510, the updated settings are stored in the memory of the device. Upon installation, it is checked whether the configuration is performed successfully or if there are any errors. In case the configuration is successful, at 512, a configuration status is transmitted to the remote server. Else, the one or more configuration files are requested/retrieved again from the remote server. In such cases, a notification can be sent to the remote server or to the manufacturer to address any configuration related issues.

Figure 7:
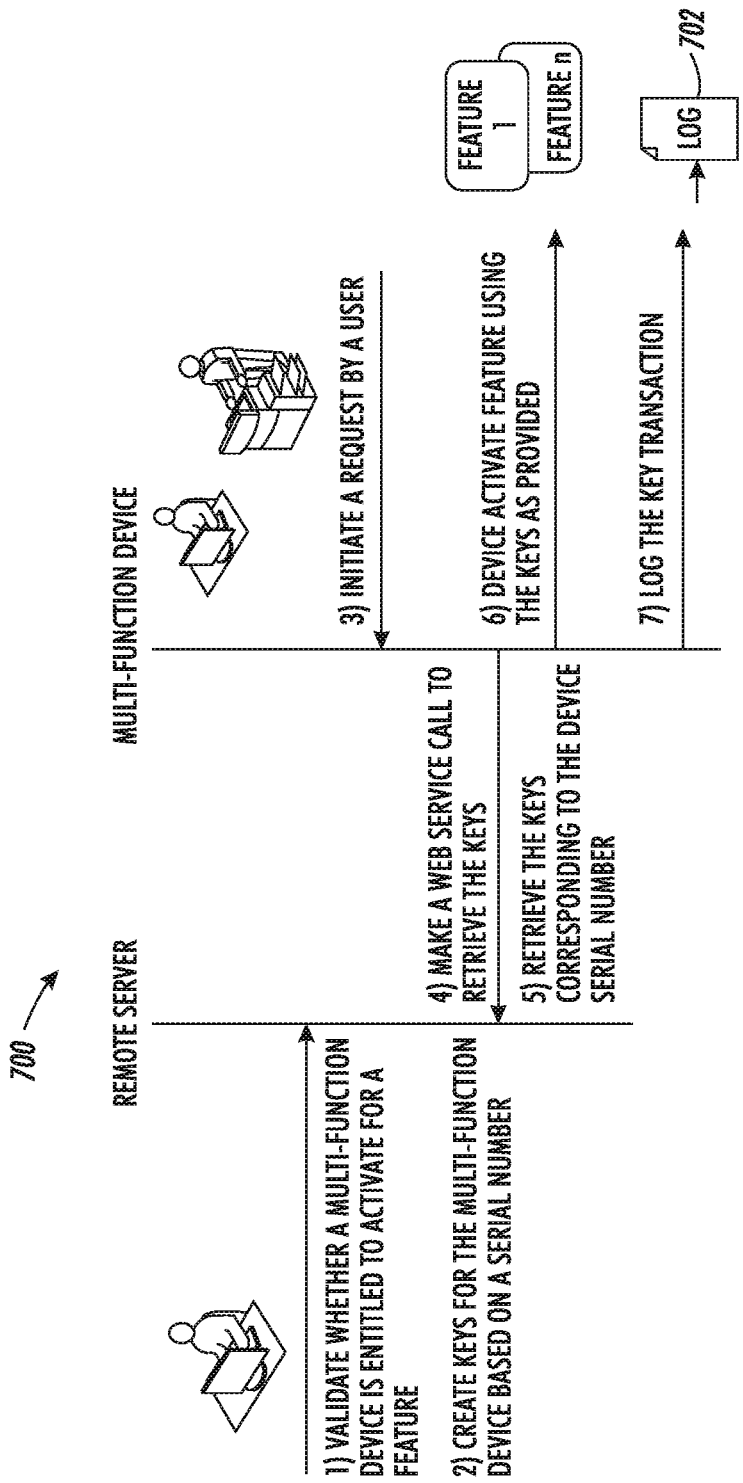
FIG. 7 shows a flow diagram indicating an interaction between a remote server and a multi-function device.

FIG. 7 shows a flow diagram 700 indicating interaction between a remote server and a multi-function device, according to an exemplary embodiment of the disclosure.

A business person is present at remote server's end, while a user or customer is present at the multi-function device to perform any manual tasks. Initially, the flow starts when a user places an initial request for configuring the multi-function device. The request may relate to updating an existing feature, deletion of an existing feature, addition of a new feature or a combination of these. The request is placed by making a call to a service center of the multi-function device, or via an email and a unique parameter such as a serial number of the multi-function device is communicated while placing the request. Based on the request from the user, at (1), the business person checks whether the user/multi-function device is entitled for configuration i.e., for activation of a feature. Based on the check, the business person requests the server to create one or more keys for the multi-function device based on the serial number, for example, at (2). The keys are then saved on the server. The keys are specific to the multi-function device and to the configuration request. Thereafter, a confirmation is sent to the user for activation.

Figure 6:
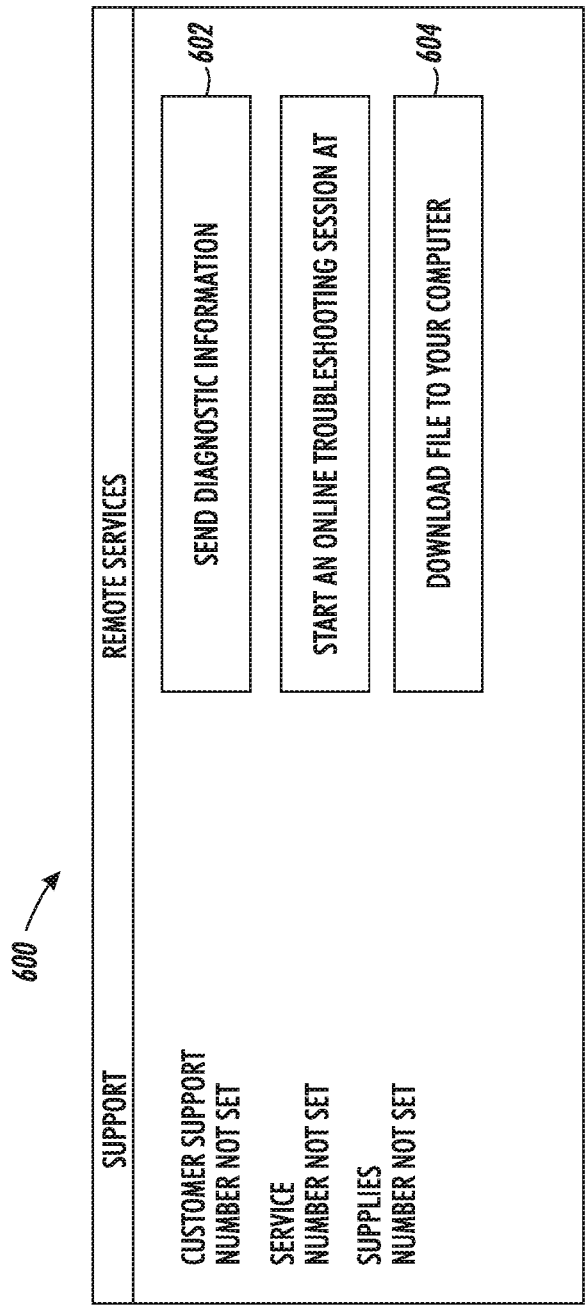
FIG. 6 shows an exemplary snapshot of a multi-function device.

Upon receiving the confirmation, at (3), the user initiates a sync request via his multi-function device. For example, a user can initiate the request via pressing a "send to diagnostic button" 602 as shown in FIG. 6. In another example, the user can raise the request via a web link. For example, the user presses "Send Diagnostic Information button" via a web user interface or a local user interface of the device. Then, at (4), a web service is called to retrieve all keys as generated corresponding to the multi-function device. The keys are retrieved corresponding the serial number of the multi-function device at (5). The features are activated using the keys as retrieved from the remote server at (6). Then, a log (indicated by 702) is maintained at the multi-function device with the keys. The memory of the device is updated based on the feature activation. The log is maintained in CSV file and an XML file is also maintained with list of all keys and status of operation performed.

The log/details stored are sent by the service running on the multi-function device to the remote server. At the remote server, the details are further stored in separate databases such as a service data store and a discovery engineering data store. The business uses the data to check the successful installation of the operation corresponding to the keys. For example, it checks before and after the installation of keys.

The disclosure can be implemented for following scenarios: For example, if there is an issue with configuration of a multi-function device at customer site, the appropriate configuration can be set remotely using a key. Further, if the customer buys a feature and wants to update the feature at later stages, the feature can be modified by remotely installing the feature at the multi-function device. The scenarios mentioned herein are exemplary, the disclosure may be implemented for any scenario, where the multi-function device needs to be configured. Further, the disclosure is explained using multi-function device as an example, but it is understood that the disclosure may be implemented for any equivalent device as known in art or developed later.

The present disclosure facilities methods and systems for remotely configuring a multi-function device. There are several advantages for remotely configuring the multi-function device. For example, the methods and systems help reducing the number of physical site visits and thereby drastically reduces costs to manufacturers and users/customers. Further, it is more efficient to perform remote configuration i.e., new features or updated features can be made available immediately to the customers. Also, by automatically performing the required configuration remotely, any security risks are addressed more quickly.

For a person skilled in the art, it is understood that the use of phrase(s) "is," "are," "may," "can," "could," "will," "should," or the like is for understanding various embodiments of the present disclosure and the phrases do not limit the disclosure or its implementation in any manner.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "transmitting," or "generating," or "installing," or "configuring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for remotely configuring a multi-function device, without requiring an expert visit at a user's place, the method comprising:
    transmitting a configuration request to a remote server through the multi-function device for configuring the multi-function device along with a unique parameter of the multi-function device;
    based on the configuration request, retrieving, by the multi-function device, one or more configuration files having one or more keys from the remote server, the one or more keys are generated by the remote server based on the unique parameter of the multi-function device and one or more features to be configured related to the multi-function device; and
    automatically configuring the multi-function device by installing the one or more configuration files using the one or more keys.

2. The method of claim 1, wherein the one or more features include one or more existing features of the multi-function device and one or more new features for the multi-function device.

3. The method of claim 2, wherein the one or more features include a speed plan, a service plan and a billing impression mode.

4. The method of claim 1, wherein the configuration request relates to at least one of: updating one or more existing features of the multi-function device and installation of one or more new features on the multi-function device.

5. The method of claim 1, wherein the one or more configuration files include the unique parameter of the multi-function device, the one or more keys and details related to the configuration request.

6. The method of claim 1, further comprising storing a Uniform Resource Locator (URL) of the remote server in a memory of the multi-function device.

7. The method of claim 1, further comprising creating a log of the configuration request at the multi-function device.

8. The method of claim 1, further comprising transmitting a configuration status to the remote server.

9. The method of claim 1, further comprising removing the one or more keys from the remote server after the configuration request is completed.

10. The method of claim 1, further comprising identifying the need to configure the multi-function device.

11. A method for automatically installing one or more new features or updating one or more existing features at a multi-function device, the method comprising:
    storing settings corresponding to the one or more existing features in a memory of the multi-function device;
    transmitting a request from the multi-function device along with a unique parameter of the multi-function device to a remote server;
    based on the unique parameter, retrieving, by the multi-function device, one or more configuration files having one or more keys from the remote server, the one or more keys are generated by the remote server based on the unique parameter of the multi-function device and the one or more features to be configured related to the multi-function device;

automatically installing the one or more configuration files to install the one or more new features or to update the one or more existing features at the multi-function device;

storing updated settings in the memory of the multi-function device; and transmitting a configuration status to the remote server.

12. The method of claim 11, further comprising identifying the need for configuring the multi-function device.

13. The method of claim 11, wherein the unique parameter is a serial number of the multi-function device.

14. The method of claim 11, wherein the one or more existing features relate to a service plan, a speed plan, a billing impression mode, a print support, a language support and a security support.

15. The method of claim 11, wherein the one or more new features relate to a service plan, a speed plan, a billing impression mode, a print support, a language support and a security support.

16. The method of claim 11, wherein the configuration request is initiated by a user.

17. The method of claim 11, wherein the one or more keys are generated based on the unique parameter of the multi-function device and the request from the multi-function device.

18. A multi-function device, comprising:
a memory configured for:
storing a Uniform Resource Locator (URL) of remote services;
storing settings corresponding to one or more existing features of the multi-function device; and
a remote services client process running on the multi-function device and is configured for:
transmitting a configuration request through the multi-function device along with a unique parameter of the multi-function device to a remote server;
based on the configuration request, contacting the remote services using the stored URL to retrieve one or more configuration files having one or more keys from the remote server, the one or more keys are generated by the remote server based on the unique parameter of the multi-function device and the one or more features to be configured related to the multi-function device; and
based on the above, invoking a plug-in manager to automatically install the one or more configuration files on the multi-function device using the one or more keys, wherein the configuration request relates to at least one of: updating the one or more existing features and installation of one or more new features.

19. The multi-function device of claim 18, wherein the one or more new features and the one or more existing features relate to: a service plan, a speed plan, a billing impression mode, a print support feature, a language support feature and a security support feature.

20. The multi-function device of claim 18, wherein the remote services client process is configured for transmitting a configuration status to the remote services, based on installation of the one or more configuration files.

21. A system for remotely configuring a multi-function device, comprising:
a remote server configured to:
generate one or more keys corresponding to a request from a user for configuring the multi-function device, wherein the request relates to at least one of: updating one or more existing features and installation of one or more new features; and
store the one or more keys and one or more configuration files in the remote server; and
the multi-function device in communication with the remote server and is configured to:
store settings corresponding to the one or more existing features of the multi-function device;
transmit a configuration request through the multi-function device along with a unique parameter of the multi-function device to the remote server;
based on the unique parameter, retrieving the one or more configuration files having the one or more keys from the remote server, the one or more keys are generated by the remote server based on the unique parameter of the multi-function device and the one or more features to be configured related to the multi-function device;
automatically install the one or more configuration files to install the one or more new features or update one or more existing features of the multi-function device; and
transmit a configuration status to the remote server for validation.

22. The system of claim 21, wherein the memory of the multi-function device is configured to store updated settings based on the installation of the one or more configuration files.

23. The system of claim 21, wherein the one or more new features and the one or more existing features comprise: a speed plan, a service plan and a billing impression mode.

24. The system of claim 21, wherein the one or more keys are generated when a request from the user is received.

* * * * *